Sept. 19, 1933.     M. L. SORY     1,927,189
AUTOMOBILE HIGHWAY SAFETY WALL
Filed Oct. 20, 1932
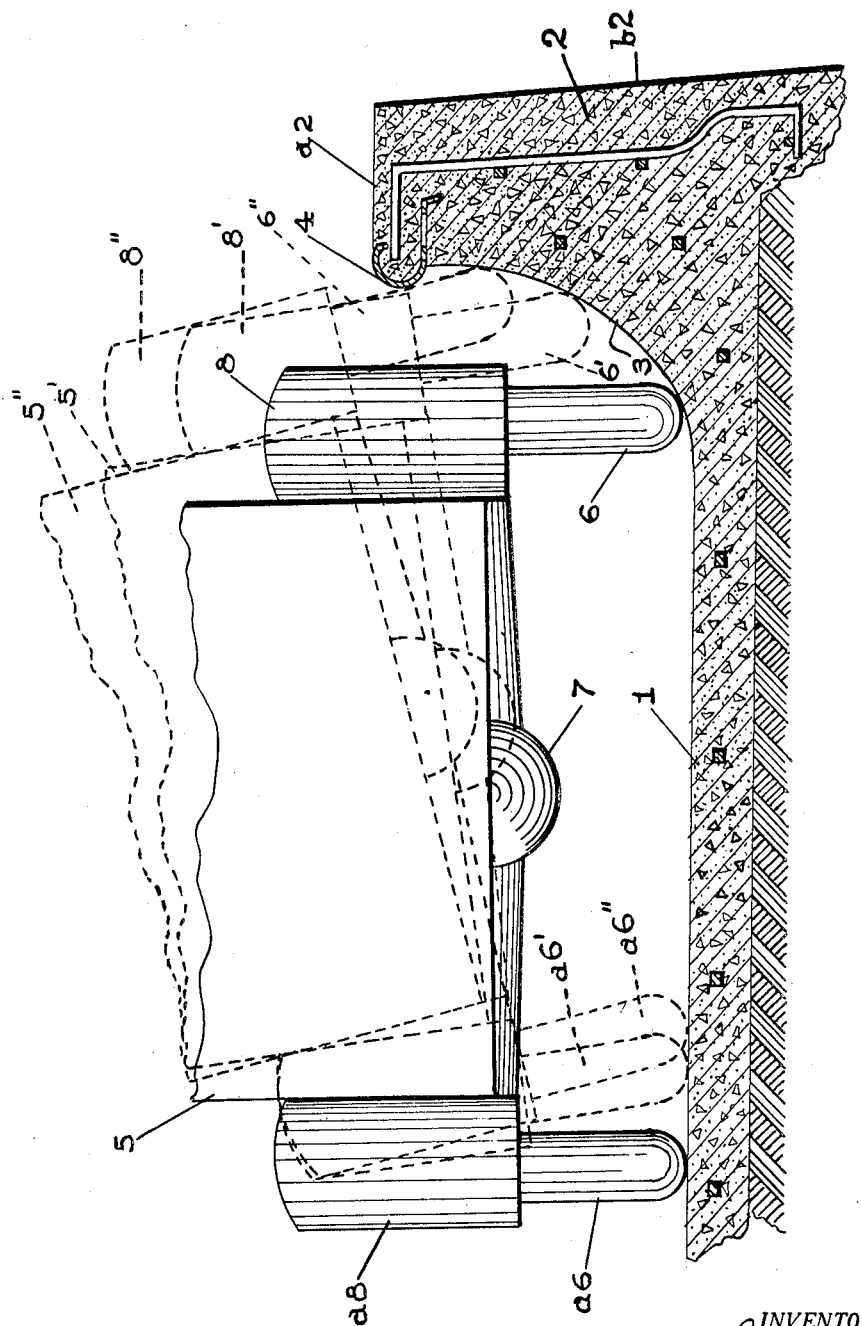
INVENTOR,
Martin L. Sory,
BY David E. Lan
ATTORNEY Patented Sept. 19, 1933

1,927,189

UNITED STATES PATENT OFFICE 1,927,189

AUTOMOBILE HIGHWAY SAFETY WALL

Martin L. Sory, Bellingham, Wash.

Application October 20, 1932. Serial No. 638,672

1 Claim. (Cl. 94—31)

My invention relates to improvements in automobile highway safety walls, and has for an object to provide a safety wall to an automobile highway.

Another object of my improvement is to increase the factor of safety to passengers travelling by automobile.

Another object of my improvement is to provide along highways an automatically safe wall constructed to gradually retard the speed of automobiles, which contact therewith, at a minimum risk of injury to both the passengers and the car.

And other objects of my improvement will appear as the description proceeds.

I attain these and other objects of my improvement with the device illustrated in the accompanying drawing; in which, is shown a cross sectional view of my improved safety automobile highway wall and a rear end outline of a fragmentary part of an automobile thereon.

With more particular reference to the illustration: the wall 2 extends along the margin of the automobile highway 1 integral therewith. On the side of the wall adjacent the automobile highway, is a concave surface 3 which rises from the level of the automobile highway to a protruding convex coping 4.

The top surface of the coping $a2$ may be plain; while, the outside surface $b2$ of the wall is preferably battered.

Upon the automobile highway in solid lines is shown an outline of the rear end view of an automobile 5, the upper part of which is broken away. Wheels 6 and $a6$ are in tractional contact with the surface of the highway. A rear axle assembly 7 and laterally projecting fenders with running boards 8 and $a8$ complete the outline.

In the dotted outline position of the automobile body 5', the wheel $a6'$ is retained upon the horizontal surface of the highway at a slight angle to the perpendicular. The wheel 6' is shown mounting the concave surface of the wall in a position thereon affording decreased traction advantage. The laterally projecting fender and running board 8' is clear of the protruding convex coping 4.

When the automobile is in the position shown in dotted lines at 5" the wheel $a6''$ is fully on the highway but with its inclination from the perpendicular slightly increased. Wheel 6" is farther up on the concave wall where its tractive advantage is at a minimum thereon and the side of the wheel bears forcedly against the coping 4 with great friction and to a degree engages with the coping being beneath the same. At this time the laterally projected parts of the car, that is, the fender, running board and wheel caps, as illustrated are clear of contact with any part of the wall.

When an automobile which is being driven along an automobile highway having my peculiar wall therealong becomes temporarily out of control, or the operator fails to properly negotiate a curve thereof, the car may assume the position illustrated at 5". Owing to the camber of the front wheels, when the rear wheel 6" also begins to mount the concave wall surface 3, the tractive action of the wheels on the concave surface is less than those on the roadway resulting in a tendency to automatically return the car to the roadway, without serious damage either to car or passengers. But, in such a case, if the usual post and cable fence lined the highway, serious injury to both car and passengers, as well as to the fence, is likely because of the abruptness of the retardation in the speed of the car and its attendant shock.

When an automobile, while travelling along a highway which is equipped with my wall, is being operated at an excessive rate of speed and the car swerves into the wall, the shape of the wall causes the outside wheels to mount the surface 3 thereof until the inside wheels are in a position relative to the wall indicated by the hind wheel at $a6''$ and the front wheels are on the curved part of the wall at positions indicated by the rear wheel at 6". Here the tractive effectiveness of the wheels on the wall curve is less than that of those on the roadway while the frictional retardation of the wheels on the curved wall surface greatly exceeds that of those on the roadway, and even if the car brakes are not being applied, the speed of the car is reduced by its contact with the wall and thus may be more easily brought under control.

The retarding action on the speeding automobile of the protruding coping 4 continues to reduce the speed of the car the wheels of which are bearing thereon, and should these wheels mount the coping, then the under parts of the car would bear on top of the continuous even wall thus causing a frictional retardation which soon would stop the car without sudden shock and with minimum risk of damage.

The tilting action on the car the outside wheels of which are rolling on the concave wall surface 3 at no time may endanger its stability or cause it to overturn into the traffic, because the resultant momentum of the car has a component directed toward the wall which effectively opposes the same without causing the inside car wheels to leave the pavement.

Having thus disclosed my invention, what I claim as new therein and desire to secure by Letters Patent is,—

A marginal safety wall along a roadway having the side thereof adjacent the said roadway continuously curved upward and inclined outwardly from the said roadway, and a convex coping on the top of the said wall overhanging the said curved surface thereof adjacent the said roadway.

MARTIN L. SORY.